United States Patent
Chappell (10) Patent No.: US 10,712,504 B2
(45) Date of Patent: Jul. 14, 2020

(54) HYBRID ELECTRICAL AND FIBER OPTIC OUTLET

(71) Applicant: COMMSCOPE TECHNOLOGIES LLC, Hickory, NC (US)

(72) Inventor: Eric Ryan Chappell, Statesville, NC (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 16/090,544

(22) PCT Filed: Mar. 27, 2017

(86) PCT No.: PCT/US2017/024276
§ 371 (c)(1),
(2) Date: Oct. 1, 2018

(87) PCT Pub. No.: WO2017/172600
PCT Pub. Date: Oct. 5, 2017

(65) Prior Publication Data
US 2019/0113689 A1 Apr. 18, 2019

Related U.S. Application Data

(60) Provisional application No. 62/317,082, filed on Apr. 1, 2016.

(51) Int. Cl.
*G02B 6/38* (2006.01)
*H01R 25/00* (2006.01)

(52) U.S. Cl.
CPC ............ *G02B 6/3825* (2013.01); *G02B 6/38* (2013.01); *G02B 6/3885* (2013.01);
(Continued)

(58) Field of Classification Search
CPC ...... G02B 6/3825; G02B 6/38; G02B 6/3885; G02B 6/3893; G02B 6/3897; H01R 25/006
(Continued)

(56) References Cited

U.S. PATENT DOCUMENTS

| 5,696,861 A | 12/1997 | Schimmeyer et al. |
| 6,457,874 B1 | 10/2002 | Clapp, Jr. et al. |

(Continued)

FOREIGN PATENT DOCUMENTS

| DE | 20 2004 004 746 U1 | 6/2004 |
| EP | 2 105 770 A1 | 9/2009 |

(Continued)

OTHER PUBLICATIONS

International Search Report and Written Opinion of the International Searching Authority for International Patent Application No. PCT/US2017/024276 dated Jul. 4, 2017, 9 pages.

(Continued)

*Primary Examiner* — Michael P Mooney
(74) *Attorney, Agent, or Firm* — Merchant & Gould P.C.

(57) ABSTRACT

A hybrid outlet system includes an electrical outlet, a fiber optic adapter, and a single faceplate. The electrical outlet is coupled to an electrical system and configured to receive an electrical plug coupled to an electrically powered device. The fiber optic adapter is coupled to a fiber optic network and configured to receive a fiber optic connector coupled to a first end of an optical fiber; the second end of the optical fiber being coupled to a telecommunication or data communication device. The single faceplate is configured to provide plug coupling access to the electrical outlet and connector coupling access to the fiber optic adapter.

20 Claims, 9 Drawing Sheets

(52) U.S. Cl.
CPC ......... *G02B 6/3893* (2013.01); *G02B 6/3897* (2013.01); *H01R 25/006* (2013.01)

(58) Field of Classification Search
USPC ..................................................... 385/53–92
See application file for complete search history.

(56) References Cited

U.S. PATENT DOCUMENTS

| | | | |
|---|---|---|---|
| 6,533,466 | B1 | 3/2003 | Smith |
| 6,854,895 | B2 | 2/2005 | Coffey et al. |
| 7,720,343 | B2 | 5/2010 | Barth et al. |
| 8,636,425 | B2 | 1/2014 | Nhep |
| 8,755,174 | B2 | 6/2014 | Ogle et al. |
| 2004/0252078 | A1* | 12/2004 | Fischer ................ H04B 10/40 345/46 |
| 2005/0118880 | A1 | 6/2005 | Reichle |
| 2010/0080513 | A1* | 4/2010 | Hamada ............... G02B 6/4466 385/75 |
| 2010/0228687 | A1* | 9/2010 | Lewis, Jr. ............ G06Q 50/06 705/412 |
| 2014/0169785 | A1* | 6/2014 | Roullot ................ H04B 10/40 398/25 |
| 2015/0038007 | A1 | 2/2015 | Stone |
| 2015/0104169 | A1* | 4/2015 | Tang ....................... H04L 49/30 398/45 |
| 2017/0090137 | A1* | 3/2017 | Woodward ........... G02B 6/4471 |
| 2017/0110782 | A1* | 4/2017 | Iwasaki .................... H01Q 1/22 |
| 2017/0254963 | A1* | 9/2017 | Sparrowhawk ...... G02B 6/3849 |

FOREIGN PATENT DOCUMENTS

| | | |
|---|---|---|
| FR | 2 952 191 A3 | 5/2001 |
| JP | 3-360996 B2 | 1/2003 |
| JP | 2008-176108 A | 7/2008 |
| JP | 2011-029200 A | 2/2011 |
| WO | 2015/144883 A1 | 10/2015 |

OTHER PUBLICATIONS

Extended European Search Report for corresponding European Patent Application No. 17776381.0 dated Oct. 31, 2019, 9 pages.

* cited by examiner

PRIOR ART

FIG. 1

PRIOR ART

FIG. 2

PRIOR ART

FIG. 3

PRIOR ART

FIG. 4

PRIOR ART

FIG. 5

PRIOR ART

FIG. 6

PRIOR ART

HYBRID ELECTRICAL AND FIBER OPTIC OUTLET

CROSS-REFERENCE TO RELATED APPLICATION

This application is a National Stage of PCT/US2017/024276, filed on Mar. 27, 2017, which claims the benefit of U.S. Patent Application Ser. No. 62/317,082, filed on Apr. 1, 2016, the disclosures of which are incorporated herein by reference in their entireties. To the extent appropriate, a claim of priority is made to each of the above disclosed applications.

BACKGROUND OF THE DISCLOSURE

Electrically powered devices are a part of everyday life and have been so for around 100 years. One can typically expect to find numerous electrical outlets within a single room by which one can tap into the mains power supply and power one's appliances, televisions, hairdryers, tools, etc.

The addition of fiber optic communication networks to our everyday lives has become more and more common. The ability to transfer significantly larger amounts of data over longer spans, as compared to wired communication networks, has increased the desire to utilize fiber optics for telecommunication and computer networking. Yet the ability to tap into a fiber optic network is not commonly available to the average person.

SUMMARY

The present disclosure is directed to electrical outlets and, more particularly, to electrical outlets that incorporate fiber optic network connection capability.

A hybrid outlet system includes an electrical outlet, a fiber optic adapter, and a single faceplate. The electrical outlet is coupled to an electrical system and configured to receive an electrical plug coupled to an electrically powered device. The fiber optic adapter is coupled to a fiber optic network and configured to receive a fiber optic connector coupled to a first end of an optical fiber; the second end of the optical fiber being coupled to a telecommunication or data communication device. The single faceplate is configured to provide plug coupling access to the electrical outlet and connector coupling access to the fiber optic adapter.

A faceplate includes a plate and a fiber optic adapter. The plate has a front surface, a back surface and a thickness between the front and back surface. The plate includes an opening that is configured to accommodate the shape and size of an electrical outlet. The opening of the plate is further configured to enable electrical plug coupling access to the outlet. The fiber optic adapter extends through the thickness of the plate and is configured to provide fiber optic connector coupling access at both the front surface and the back surface of the plate.

A method comprises coupling an electrical system to an electrical outlet with the outlet configured to receive an electrical plug of an electrically powered device. The method further comprises coupling a fiber optic network to a fiber optic adapter with the fiber optic adapter configured to receive a fiber optic connector coupled to a first end of an optical fiber; the second end of the optical fiber coupled to a telecommunication or data communication device. The method further comprises providing plug access to the electrical outlet and connector access to the fiber optic adapter via a single faceplate with the single faceplate including the fiber optic adapter and having an opening configured to accommodate the electrical outlet.

The above summary is not intended to describe each embodiment or every implementation. A more complete understanding will become apparent and appreciated by referring to the following detailed description and claims in conjunction with the accompanying drawings.

DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

A hybrid electrical and fiber optic outlet provides convenient, single location access to both a building's electrical system for powering electrical devices and a building's fiber optic network for enabling telecommunication and/or data communication among network devices.

Figure 1:
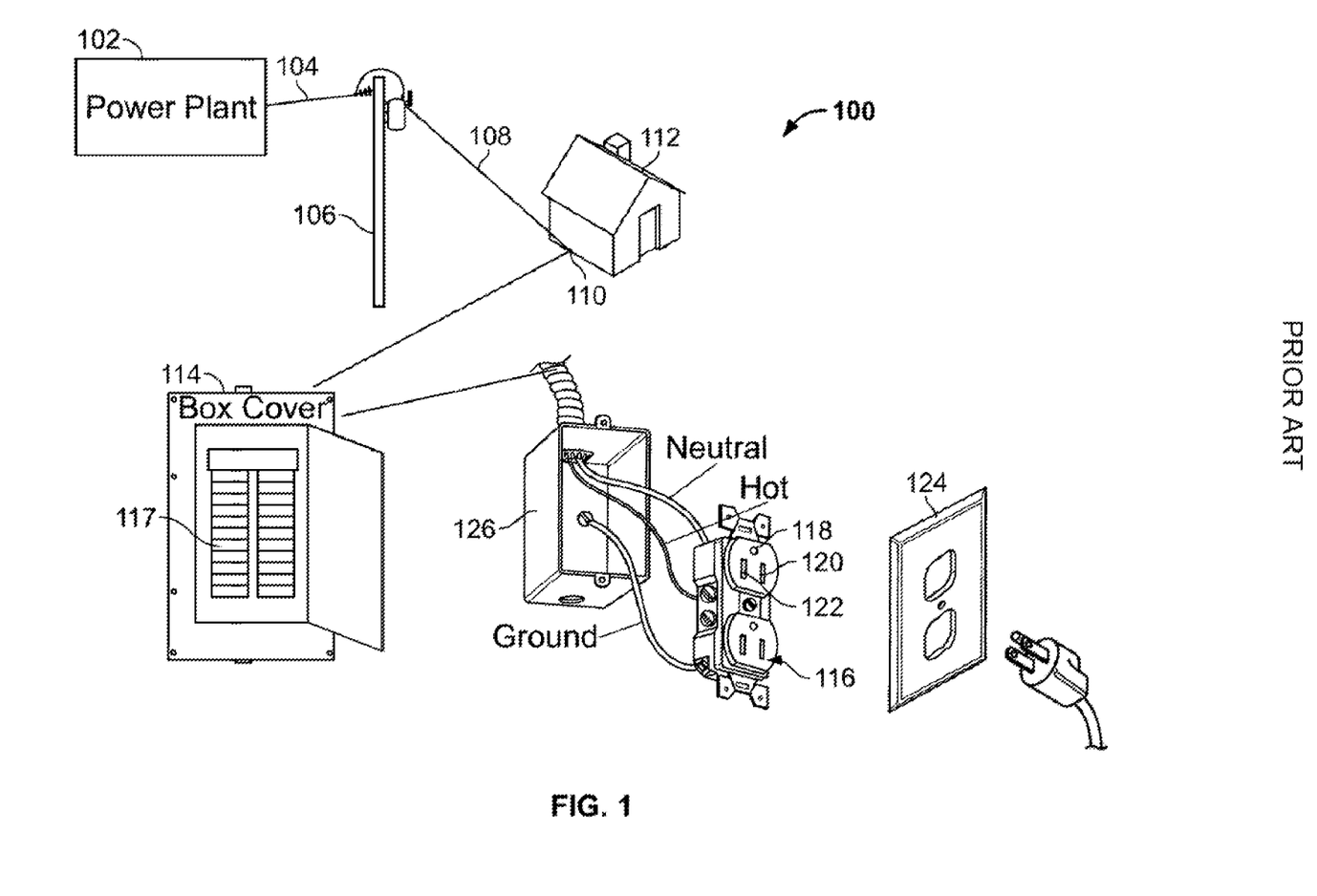
FIG. 1 is a simplified schematic representation of an electrical system.

FIG. 1 illustrates an example of a simplified electrical system 100. As shown, power is transferred from a power plant 102 over a main transmission line 104 then through various substations (not shown) to reduce the line voltage to a usable level. At power pole 106, the line voltage has been reduced to 240 volts and is delivered, via a service line 108, to a service head 110 of a home 112, or other type of building needing electrical service. The service head 110 provides power to an electrical service panel 114, which serves as a distribution point for delivering electricity to outlets 116 throughout the building 112. The electrical panel 114 is equipped with breakers 117, or fuses, that shut off power to the various electrical circuits if an electrical system failure occurs.

The outlet 116 is a 120 volt alternating current (A/C) outlet, with the current cycling at approximately 60 Hz. The outlet 116 is a standard, type B outlet that is typically used in the United States, Canada, Mexico and Japan. The outlet 116 is configured to receive a three-pronged plug. The round hole 118 of the outlet 116 is configured to receive a round prong and is the safety ground, which is tied to earth ground. The wider slot 120 of the outlet 116 is configured to receive a bladed prong and is neutral. The narrower slot 122 of the outlet 116 is configured to receive a second bladed prong and is the hot connection carrying the 120 volts. Current travels down the hot connection, through a plugged in device, and back through the neutral establishing a closed circuit (various types of on/off switches may also be included in the circuit to enable/block the flow of current).

Figure 2:
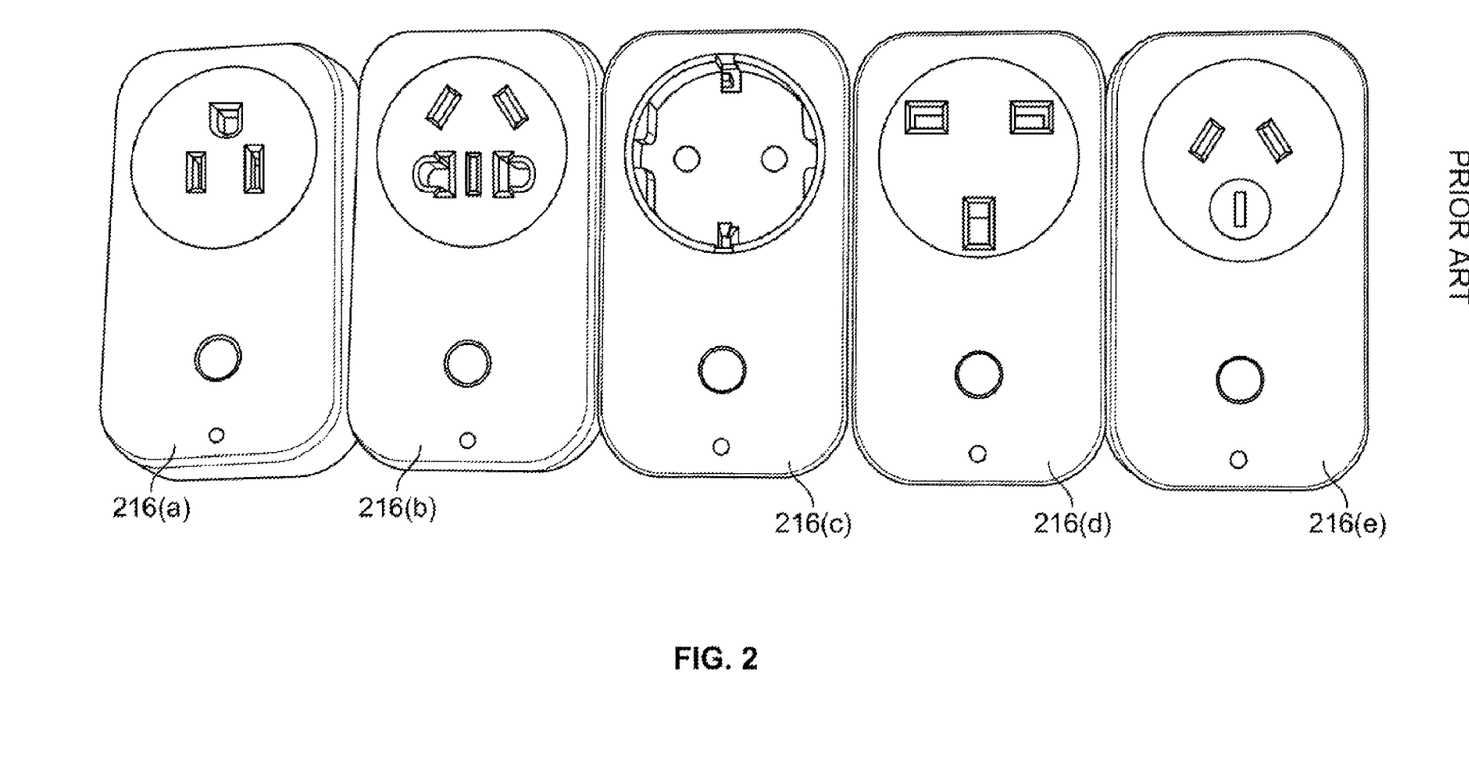
FIG. 2 is a schematic of a plurality of electrical outlets.

In other parts of the world, the outlet configurations vary from those that accept three-pronged plugs to those that accept two-pronged plugs, as well as from Type A outlets to Type O outlets, according to the national standards of each country. Further, outlets in many countries are configured to handle 240 volts alternating current at a frequency of 50 Hz, such as those in the European Union. Further, the outlet 116 may be configured as a dual outlet, like that shown in FIG. 1, or a single outlet. A faceplate 124 is configured to accommodate the configuration of the outlet 116 and to enclose the outlet box 126. FIG. 2 illustrates a number of examples of outlets including: (1) a U.S. Type B outlet, 216(*a*); (2) a Chinese Type I outlet, 216(*b*); (3) a European Type F outlet, 216(*c*); (4) a United Kingdom Type G outlet, 216(*d*); and (5) an Australian Type I outlet, 216(*e*).

Figure 3:
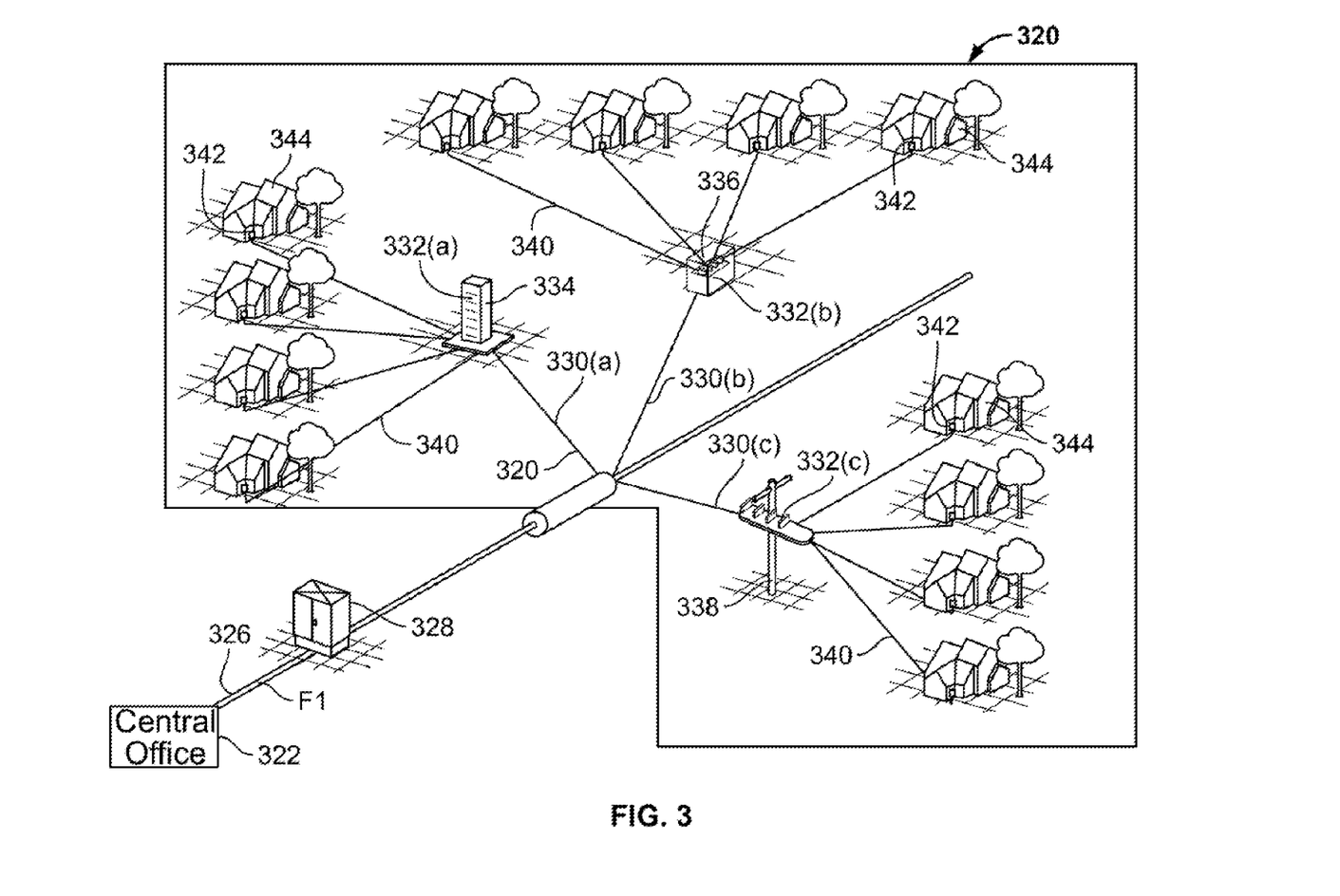
FIG. 3 is a schematic representation of a fiber optic network.

FIG. 3 illustrates an example of a passive fiber optic network 320. Generally, the fiber optic network 320 is adapted for transmitting fiber optic telecommunication services between a central office 322 and a local area 324 (e.g., a local loop) to a subscriber location 344. The network includes an F1 distribution cable 326 that preferably includes a plurality of optical fibers. For example, in one embodiment, the F1 distribution cable 326 may have on the order of 12 to 48 fibers. However, alternative numbers of fibers may also be used. One or more of the optical fibers of the F1 distribution cable 326 are routed to a fiber distribution hub 328. An exemplary fiber distribution hub has been described in U.S. Pat. No. 7,720,343, which is hereby incorporated by reference in its entirety. The fiber distribution hub 328 preferably includes one or more passive optical splitters adapted to split signals carried by the fibers of the F1 distribution cable 326 into a plurality of fibers that are optically coupled to one or more F2 distribution cables 330(*a*)-330(*c*) routed from the distribution hub 328 into the local area 324. The distribution cables 330(*a*)-330(*c*) may include 4, 6, 8, 12 or more optical fibers.

Each of the distribution cables 330(*a*)-330(*c*) is connected to a multiport service terminal (MST) as shown in FIG. 3, with distribution cable 330(*a*) connected to an MST 332(*a*) mounted in a pedestal 334, distribution cable 330(*b*) connected to an MST 332(*b*) mounted in a hand-hole 336, and distribution cable 330(*c*) connected to an MST 332(*c*) mounted on a pole 338 (or alternatively, an aerial strand mount). Drop cables 340 connect the optical fibers at the MSTs 332(*a*)-332(*c*) to optical network terminals (ONTs) 342 located at subscriber locations 344.

Figure 4:
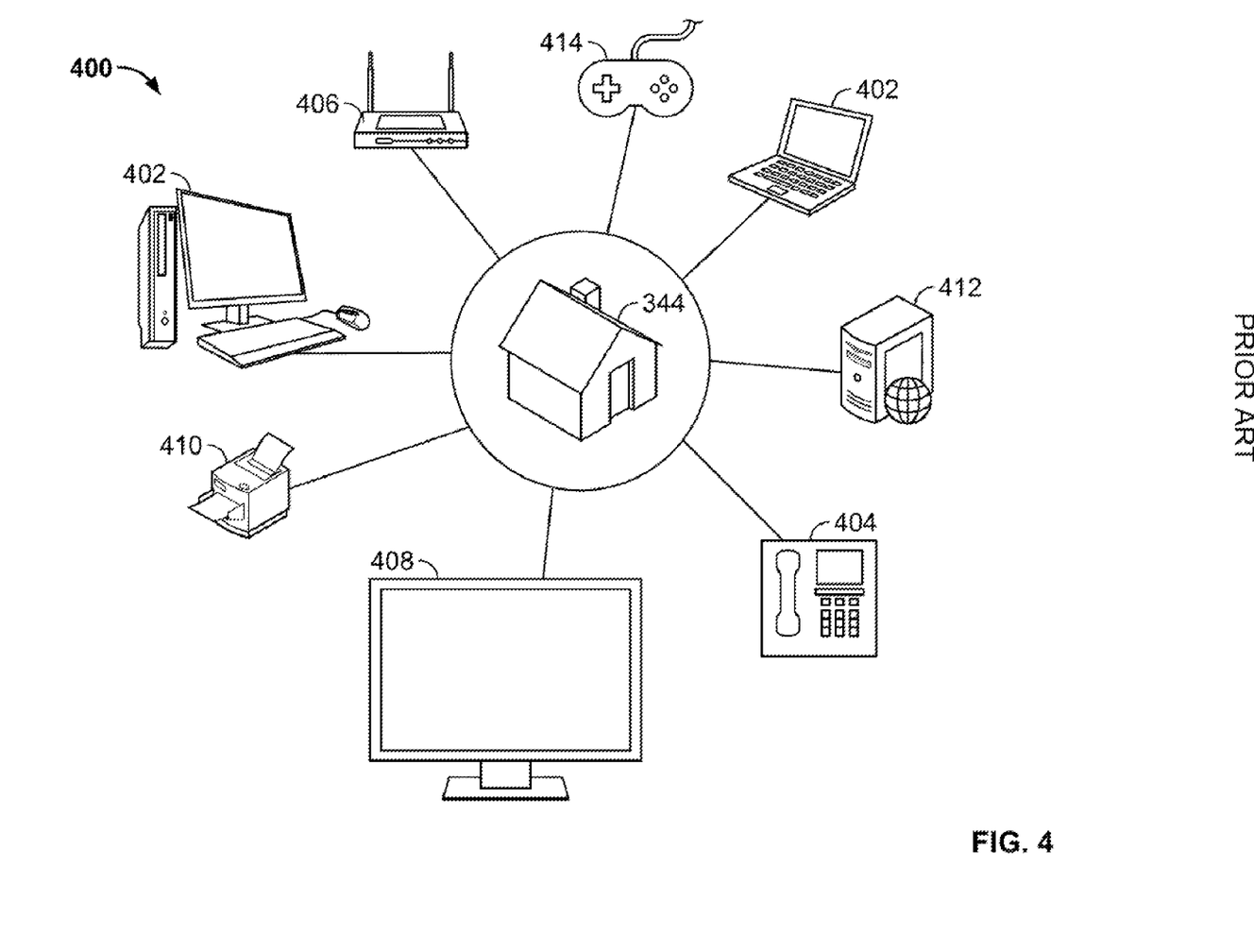
FIG. 4 is a schematic representation of an internal fiber optic network.

At the subscriber location 344, referring now to FIG. 4, an internal network 400 (considered part of fiber optic network 320) is distributed throughout the building or at least to a router. Further, dependent upon the type of optical fiber service being provided and dependent upon the devices to which the optical fibers connect, the ends of the optical fibers are provided with one or more types of connectors enabling connection to network devices, such as computers 402, phones 404, routers 406, televisions 408, printers 410, servers 412, game consoles 414 etc. The types of connectors may include but are not limited to LC connectors, SC connectors and MPO connectors.

Figure 5:
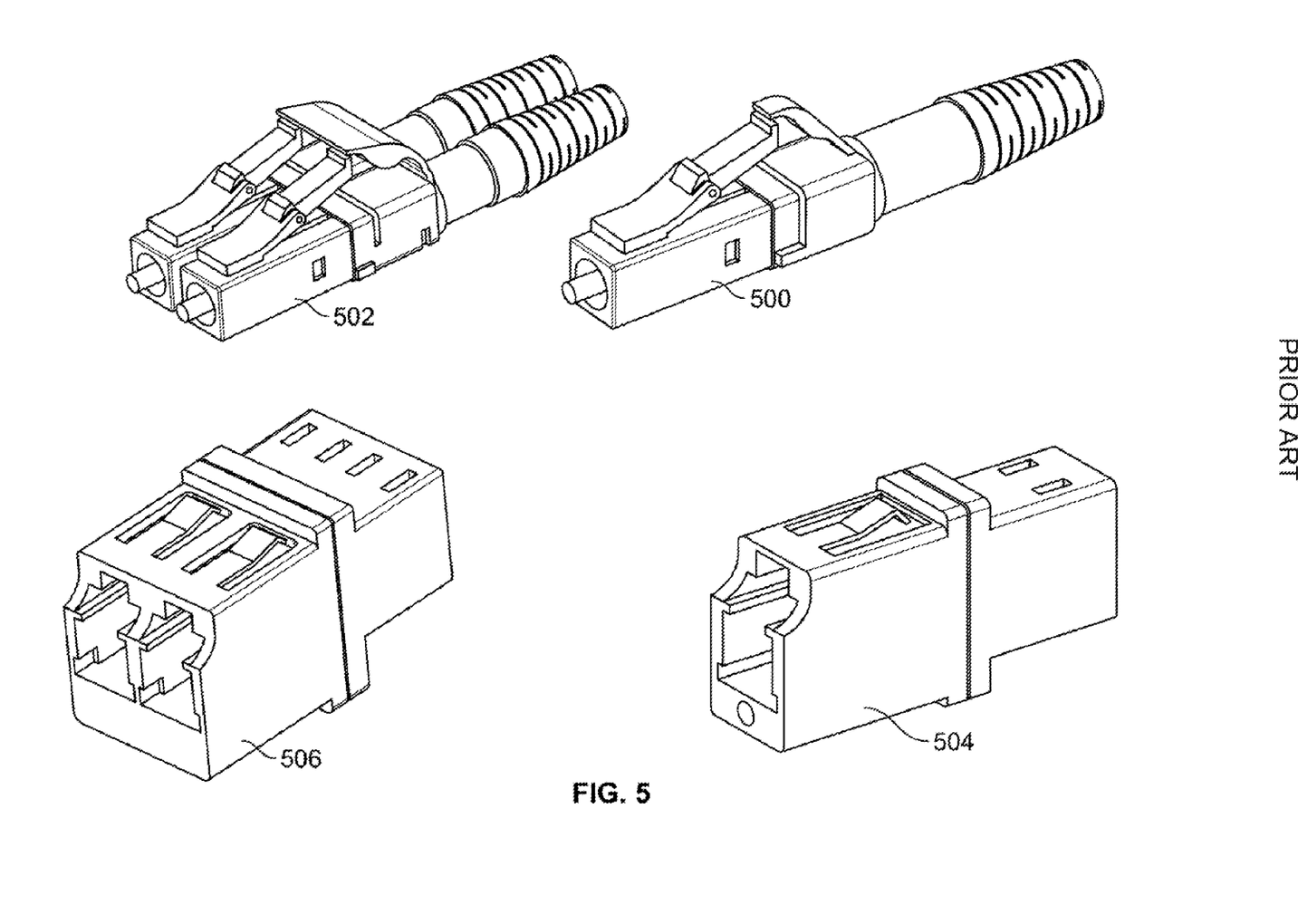
FIG. 5 is a perspective view of simplex and duplex LC connectors and LC adapters/receptacles.

FIG. 5 illustrates a simplex LC connector 500, configured to hold a single optical fiber, and a duplex LC connector 502, configured to hold two optical fibers. The LC connectors are small form factor (SFF) connectors and use a retaining tab mechanism to maintain a connecting position with a mating LC connector, receptacle or adapter (the adapter may be used as an interface between two LC connectors, or an LC connector and a different type of connector). A simplex LC adapter 504 and a duplex LC adapter 506 are also illustrated in FIG. 5. Typical applications for LC connectors include, but are not limited to, high-density applications, telecommunication and data communication applications where small form-factor pluggable transceivers, e.g., SFP, SFP+ and XFP transceivers, are used.

Figure 6:
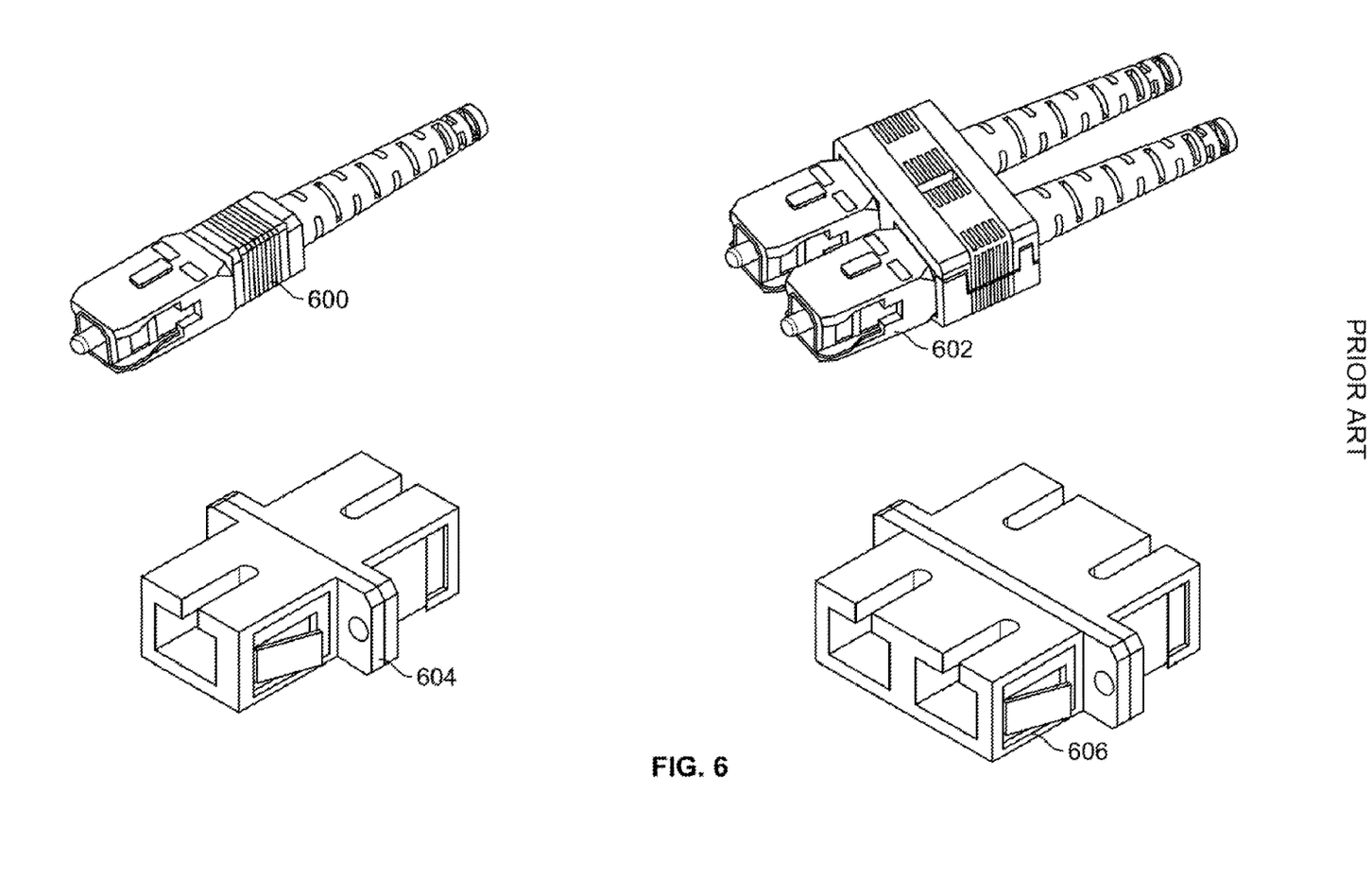
FIG. 6 is a perspective view of simplex and duplex SC connectors and SC adapters/receptacles.

FIG. 6 illustrates a simplex SC connector 600, configured to hold a single optical fiber, and a duplex SC connector 602, configured to hold two optical fibers. The SC connectors use a push-on/pull-off mating mechanism to interface with another SC connector, receptacle, or adapter (the adapter may be used as an interface between two SC connectors, or an SC connector and a different type of connector). A simplex SC adapter 604 and a duplex LC adapter 606 are also illustrated in FIG. 6. Typical applications for SC connectors include, but are not limited to, telecommunication and data communication applications, Gigabit-capable Passive Optical Network (GPON) applications, Ethernet Passive Optical Network (EPON) applications, and Gigbabit Interface Converter (GBIC) transceiver applications.

Further details regarding LC and SC connectors may be found in U.S. Pat. No. 8,636,425, which is hereby incorporated by reference in its entirety.

Figure 7:
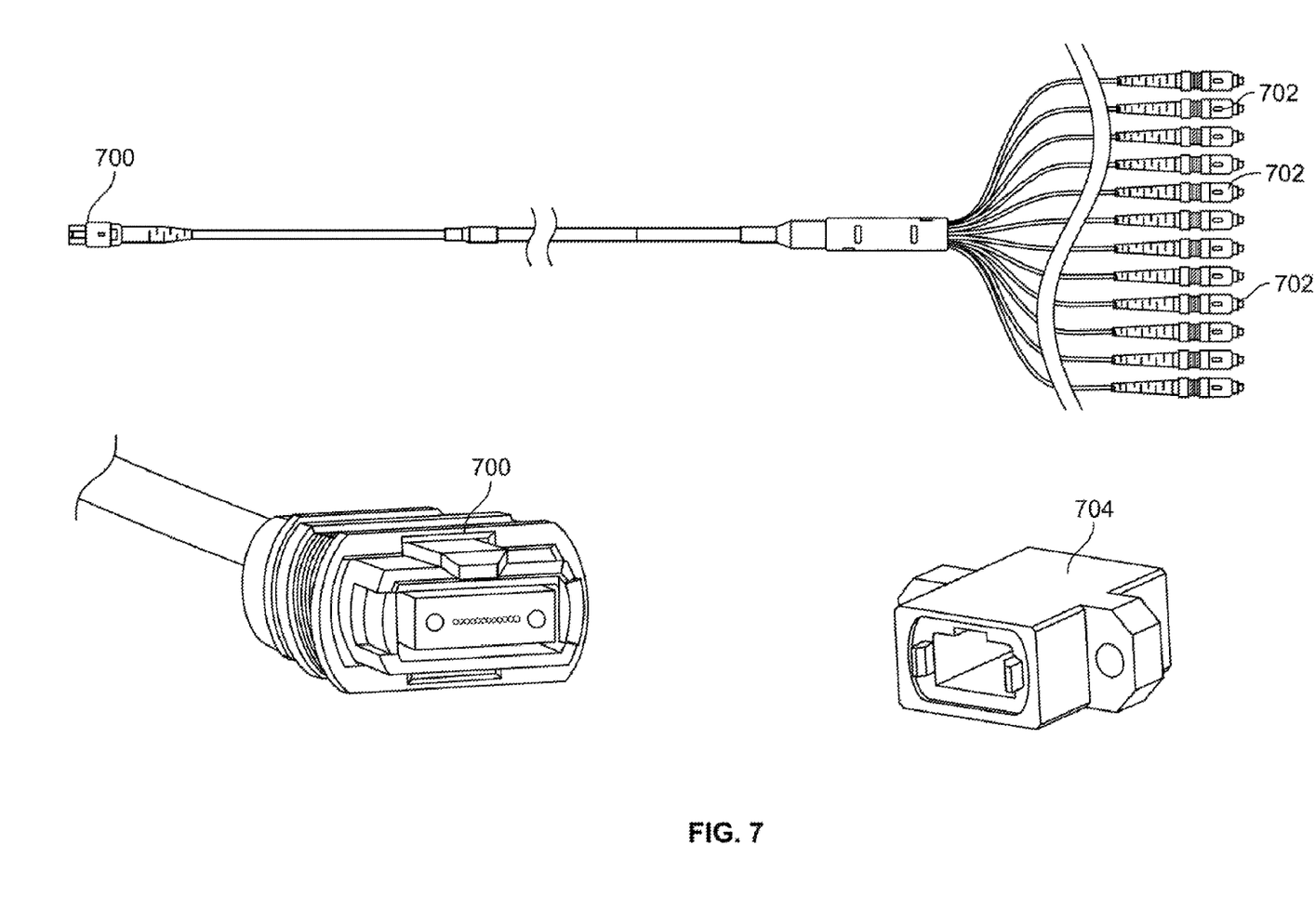
FIG. 7 is a perspective and plan view of an MPO connector and an MPO adapter/receptacle.

FIG. 7 illustrates an MPO (Multi-fiber Push-On) connector 700 that is configured to terminate several fibers, e.g. up to 12 optical fibers 702, in a single ferrule. As the name implies, MPO connectors use a push-on/pull-off latch-type mating mechanism to interface with another MPO connector, receptacle, or adapter (the adapter may be used as an interface between two MPO connectors, or an MPO connector and a different type of connector). An MPO adapter 704 is also illustrated in FIG. 7. Typical applications for MPO connectors include, but are not limited to, applications where single-mode or multi-mode multi-fiber ribbon cables are used, indoor cabling, and device interconnections.

Figure 8:
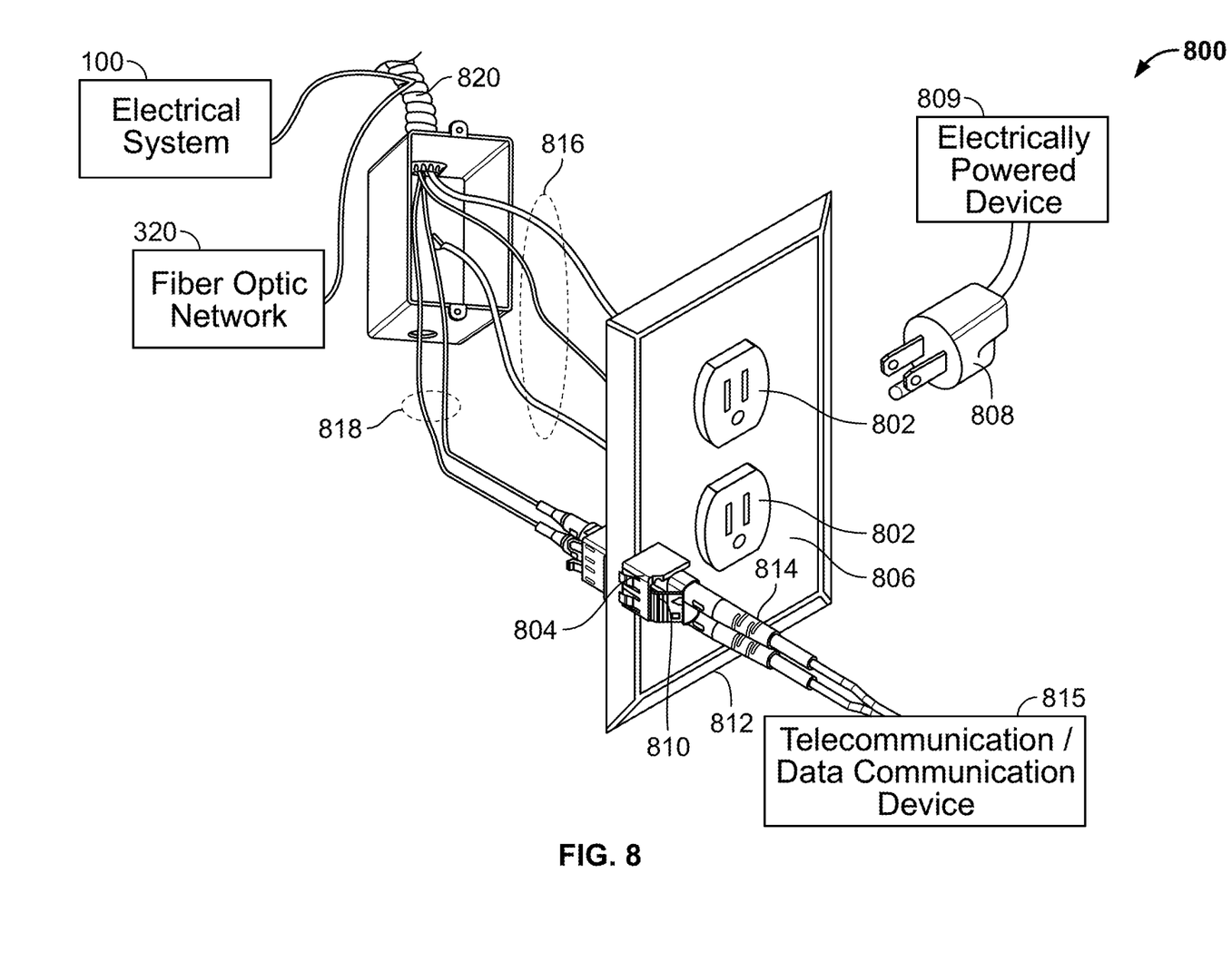
FIG. 8 is a schematic representation of a hybrid outlet.

While the electrical system 100 and the fiber optic network 320 have been described above as two distinct systems, the present disclosure is directed to the ability to access the utility provided by each system via a single hybrid outlet, an example of which is provided in FIG. 8. The hybrid outlet 800 generally includes one or more electrical outlets 802, one or more fiber optic receptacles or adapters 804, and a faceplate 806 configured to accommodate the electrical and fiber optic configurations. The example hybrid outlet 800 configuration of FIG. 8 illustrates dual electrical outlets 802 electrically coupled to the electrical system 100 and configured to receive an electrical plug 808 that is coupled to an electrically power device 809. The hybrid outlet 800 also includes a duplex LC adapter 804 coupled to the fiber optic network 320 and configured to receive a duplex LC connector 810 coupled to first and second optical fibers 812, 814, which are coupled to a telecommunication or data communication device 815. The electrical wiring 816 and fiber optic cabling 818 of FIG. 8 are fed through the same conduit 820. However, in other embodiments, the wiring 816 and cabling 818 are fed through separate conduits yet still come together at the same hybrid outlet 800.

Figure 9:
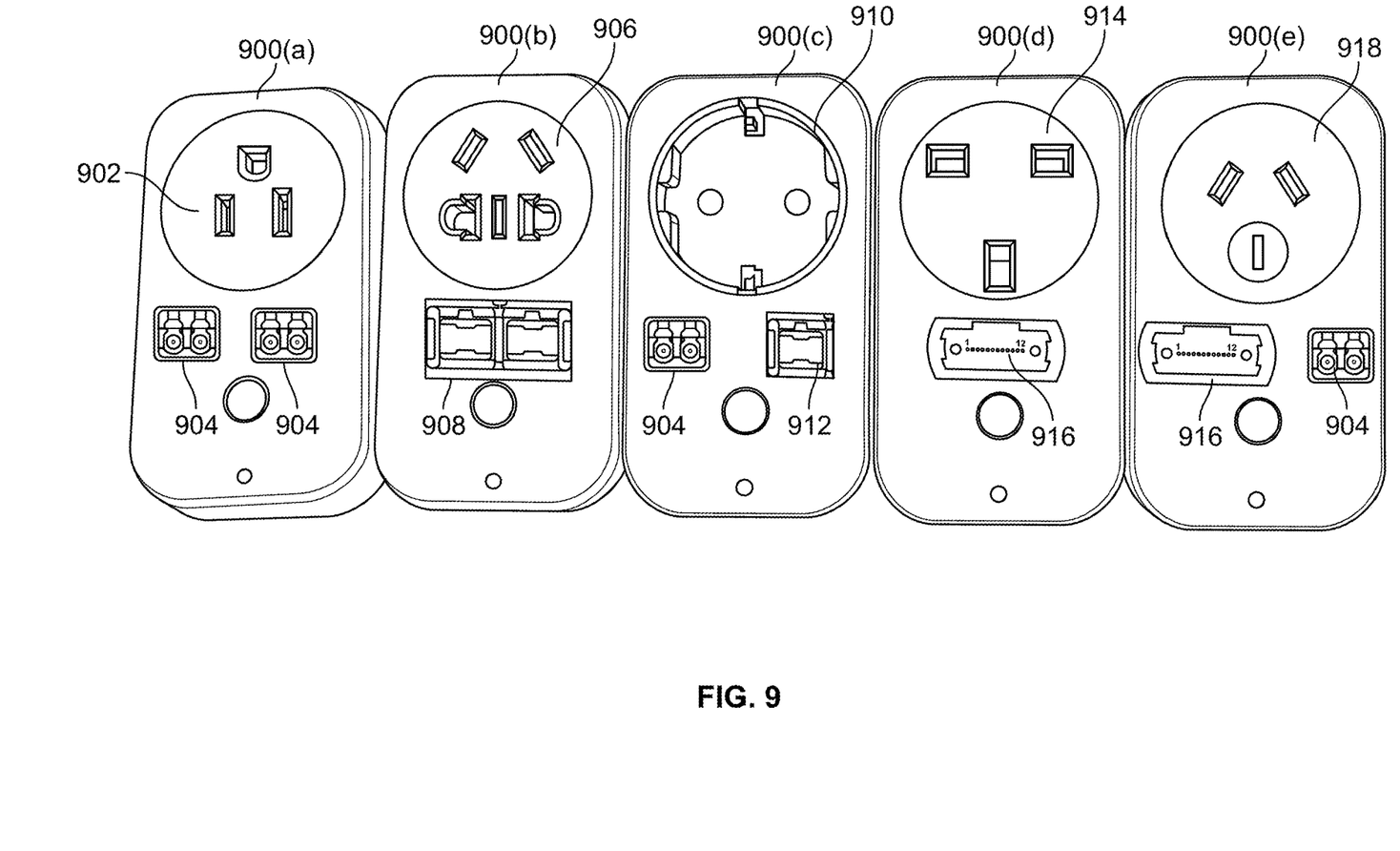
FIG. 9 is a schematic representation of a plurality of differently configured hybrid outlet.

The hybrid outlet 800 can be configured to accommodate any type of electrical outlet, (e.g., Types A-O; single, dual or multi-outlet, 120 V or 240 V) in combination with any type of fiber optic receptacle or adapter (e.g., simplex, duplex, or multi-fiber; LC, SC, MPO, etc.). FIG. 9 illustrates the electrical outlets of FIG. 2 now in examples of hybrid outlet configurations, which include: (1) hybrid outlet 900(*a*) comprising a U.S. Type B outlet 902 and a pair of duplex LC adapters 904; (2) a hybrid outlet 900(*b*) comprising a Chinese Type I outlet 906 and duplex SC adapter 908; (3) a hybrid outlet 900(*c*) comprising a European Type F outlet 910, a duplex LC adapter 904 and a simplex SC adapter 912; (4) a hybrid outlet 900(*d*) comprising a United Kingdom Type G outlet 914 and an MPO adapter 916; and (5) a hybrid outlet 900(*e*) comprising an Australian Type I outlet 918, an MPO adapter 916, and a duplex LC adapter 904. Other combinations with other types of outlets and fiber optic receptacles or adapters are possible and considered within the scope of the disclosure including for example more than two electrical outlets and/or more than two fiber optic receptacles or adapters.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. A hybrid outlet system comprising:
   an electrical outlet coupled to an electrical system and configured to receive an electrical plug that is coupled to an electrically powered device;
   a fiber optic adapter coupled to a fiber optic network and configured to receive a fiber optic connector that is coupled to a first end of an optical fiber, the second end of the optical fiber coupled to a telecommunication or data communication device; and
   a single faceplate configured to provide plug coupling access to the electrical outlet and connector coupling access to the fiber optic adapter, the single faceplate including a forward face oriented parallel to a rearward face, the forward face presenting both the electrical outlet and the connector coupling in an orientation to receive the electrical plug and the fiber optic connector, respectively, in a direction transitioning along an axis from the forward face to the rearward face, the axis being perpendicular to the forward and rearward faces.

2. The system of claim 1, wherein the electrical outlet comprises a Type A through Type O electrical outlet.

3. The system of claim 1, wherein the fiber optic adapter comprises an SC, LC or MPO adapter.

4. The system of claim 3, wherein the SC fiber optic adapter comprises a simplex adapter.

5. The system of claim 3, wherein the LC fiber optic adapter comprises a simplex adapter.

6. The system of claim 1, wherein the fiber optic adapter comprises a plurality of fiber optic adapters.

7. The system of claim 6, wherein the plurality of fiber optic adapters comprise the same type of fiber optic adapters.

8. The system of claim 6, wherein the plurality of fiber optic adapters comprise at least two different types of fiber optic adapters.

9. The system of claim 6, wherein the electrical outlet comprises a plurality of electrical outlets.

10. The system of claim 9, wherein the plurality of electrical outlets comprises at least two different types of electrical outlets.

11. A faceplate comprising:
    a plate having a front surface, a back surface and a thickness between the front and back surface, the plate including an opening configured to accommodate the shape and size of an electrical outlet, the opening further configured to enable electrical plug coupling access to the outlet along a first axis that is perpendicular to the front and back surface; and,
    a fiber optic adapter extending through the thickness of the plate and configured to provide fiber optic connector coupling access at both the front surface of the plate and the back surface of the plate, the access being provided along a second axis that is parallel to the first axis.

12. The faceplate of claim 11, wherein the plate and the fiber optic adapter are of a unitary construction.

13. The faceplate of claim 11, wherein the plate and the fiber optic adapter are each of independent construction.

14. The faceplate of claim 11, wherein the fiber optic adapter comprises a plurality of fiber optic adapters.

15. The faceplate of claim 14, wherein the plurality of fiber optic adapters are selected from LC adapters, SC adapters and MPO adapters.

16. The faceplate of claim 14, wherein the plurality of fiber optic adapters comprise the same type of fiber optic adapters.

17. The faceplate of claim 14, wherein the plurality of fiber optic adapters comprise at least two different types of fiber optic adapters.

18. The faceplate of claim 11, wherein the fiber optic adapter comprises a simplex adapter.

19. The faceplate of claim 11, wherein the fiber optic adapter comprises a duplex adapter.

20. A method comprising:
    coupling an electrical system to an electrical outlet, the electrical outlet configured to receive an electrical plug of an electrically powered device;
    coupling a fiber optic network to a fiber optic adapter, the fiber optic adapter configured to receive a fiber optic connector coupled to a first end of an optical fiber, the second end of the optical fiber coupled to a telecommunication or data communication device;
    providing plug access to the electrical outlet and connector access to the fiber optic adapter via a single faceplate defining a plane, the single faceplate including the fiber optic adapter oriented to receive the fiber optic connector along a first axis that is perpendicular to the plane and having an opening configured to accommodate the electrical outlet, the opening oriented to receive the electrical plug along a second axis that is perpendicular to the plane.

* * * * *